July 15, 1930.  A. NELSON  1,770,545
SNOWPLOW
Filed July 16, 1928   3 Sheets-Sheet 1
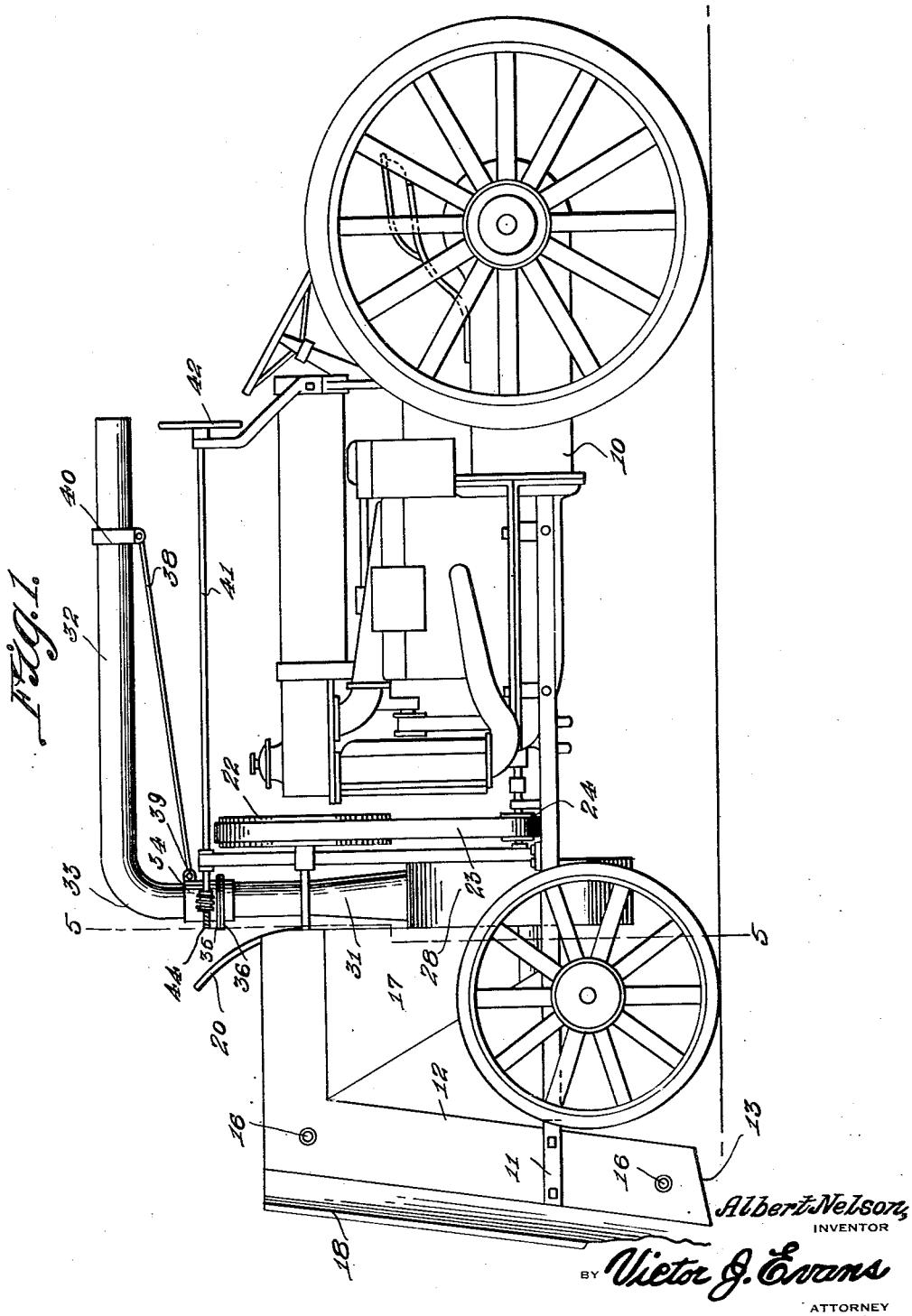
Albert Nelson
INVENTOR
BY Victor J. Evans
ATTORNEY

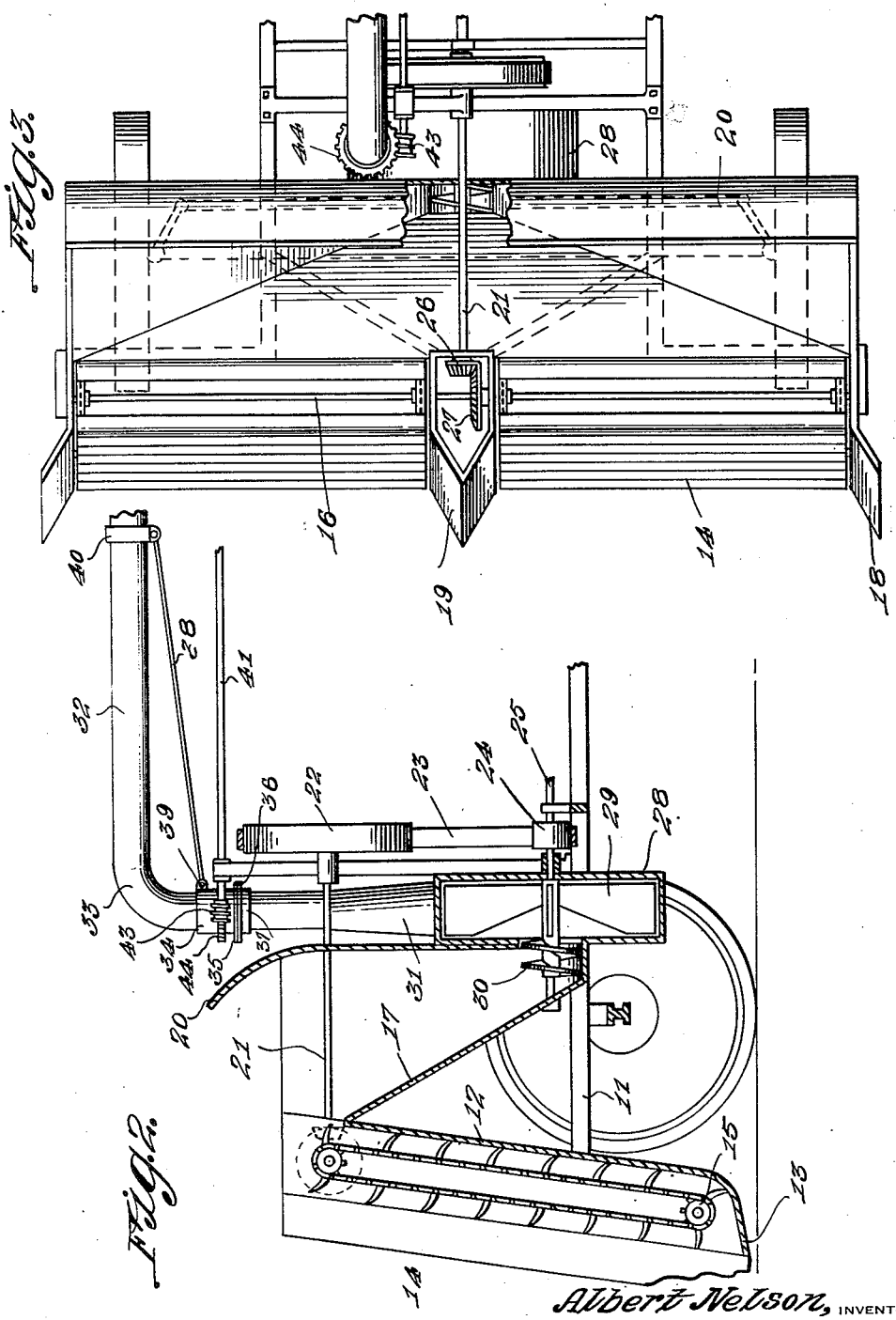

July 15, 1930.  A. NELSON  1,770,545
SNOWPLOW
Filed July 16, 1928   3 Sheets-Sheet 3
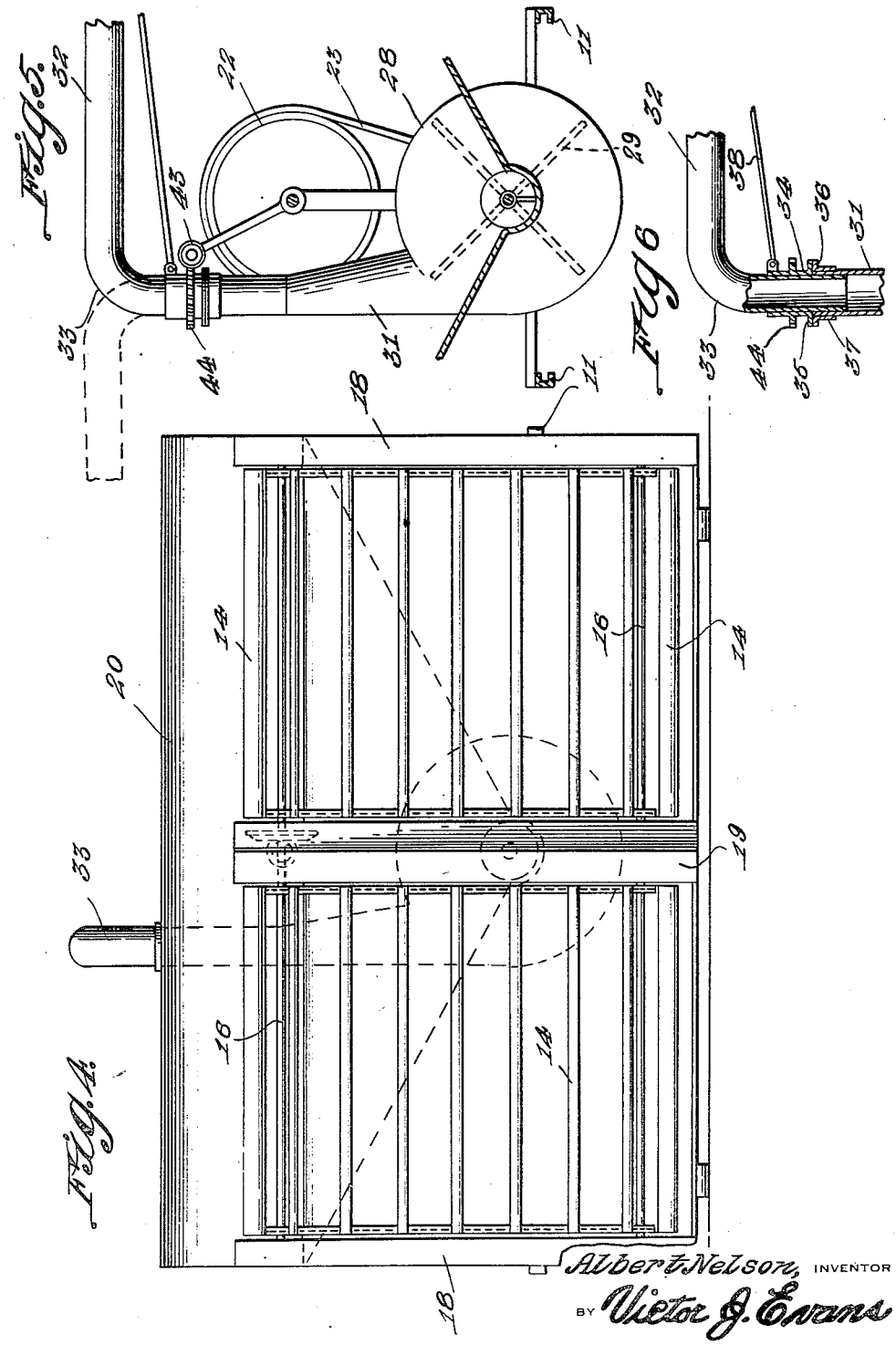

Patented July 15, 1930

1,770,545

UNITED STATES PATENT OFFICE

ALBERT NELSON, OF DECORAH, IOWA

SNOWPLOW

Application filed July 16, 1928. Serial No. 293,285.

This invention relates to plows or other implements adapted for continuous scooping and discharging operation.

An object of the invention comprehends a scoop having endless conveying means.

Another object of the invention contemplates a hopper for the conveying means.

A further object of the invention consists in the provision of a discharge apparatus for the hopper.

More specifically stated the discharge apparatus is provided with a control member whereby the work may be discharged to either side of the implement.

With the above and other objects in view, the invention further consists of the following novel features and details of construction, to be hereinafter more fully-described, illustrated in the accompanying drawings and pointed out in the appended claims.

In the drawings:—

Figure 1 is a side elevation of the invention as applied upon a tractor or other vehicle.

Figure 2 is a sectional view taken through the scoop, endless conveyor, hopper and discharge means.

Figure 3 is a top plan view of the invention per se.

Figure 4 is a front elevation of the scoop and endless conveying means.

Figure 5 is a sectional view taken on line 5—5 of Figure 1.

Figure 6 is a detail sectional view taken through a portion of the discharge means.

Referring to the drawings in detail, wherein like characters of reference denote corresponding parts, the reference character 10 indicates a Fordson or other tractor upon which the present invention is mounted.

Supporting bars 11, carried by and extended forwardly in advance of the tractor chassis, are adapted for connection with a scoop 12 having a downwardly and forwardly inclined surface engaging edge 13.

Endless conveyors 14, trained over sprockets 15, carried upon shafts 16, journaled within the side walls of the scoop 12, are adapted to discharge their work within a hopper 17 located immediately behind and having connection with the scoop 12. Guide flanges 18, vertically disposed upon the outer sides of the scoop 12, are outwardly and obliquely disposed therefrom to direct the work toward the scoop and the endless conveyors therefor. A divider 19, of substantial V-shape cross section, is included upon the hopper between the respective conveyors, whereby the work of each of the conveyors will be equalized. A baffle plate 20, forming the rear wall of the hopper 17, is adapted to deflect the work by the endless conveyors 14 toward the bottom of the hopper 17, whereby said work will not be thrown over the front of the tractor. As noted in Figure 2 of the drawings, the baffle plate 20 extends for an appreciable distance above the foremost portion of the hopper.

A shaft 21, having a pulley wheel 22 upon the innermost end thereof, is adapted for connection with a belt 23 driven from a pulley wheel 24 carried upon an extension shaft 25 from the tractor crank shaft, not shown. A pinion gear 26, carried upon the forward end of the shaft 21, is meshingly engaged with an enlarged bevel gear 27 carried upon the uppermost of the shaft 16, whereby simultaneous operation of the endless conveyors 14 will be facilitated, inasmuch as the uppermost of the shafts 16 is common to both of the conveyors.

A housing 28, located immediately behind and adjacent the lowermost end of the hopper 17, is adapted to house a blower or fan 29, included upon the shaft 25. A worm 30, extended in advance of the fan or blower 29 upon the shaft 25, is projected within the bottom of the hopper 17, whereby the work deposited therein will be fed by the worm 30 to the fan or blower 29 within the housing 28. A discharge pipe 31 is adapted for communication with the housing 28.

A nozzle or pipe 32, having an offset end 33, is adapted for reception within the uppermost end of the pipe 31 in the manner as best illustrated in Figure 6 of the drawings. A sleeve 34, carried upon the offset end 33 of the nozzle 32, terminates to provide an annular flange portion 35 upon the lower periphery thereof adapted for rotation and support upon a similar portion 36 formed upon the upper periphery of a sleeve 37 included upon the uppermost end of the discharge pipe 31.

A brace bar 38, having connection with ears 39, included upon the sleeve 34 is adapted for connection at its opposite end with the ends of a clamping band 40 located at an appropriate point in the length of the nozzle or pipe 32 to relieve strain upon the pipe and to facilitate simultaneous movement of the pipe or nozzle 32 and the sleeve 34 therefor.

A control shaft 41, mounted upon the tractor 10, is provided with a steering wheel 42 upon the innermost end thereof adjacent the steering wheel for the tractor within convenient reach of the operator therefor. A worm 43, included upon the forward end of the control shaft 41, is meshingly engaged with a worm gear 44 carried upon the outer surface of the sleeve 34.

In the event the present invention was employed in the scooping and removing of snow from roads or other highways, the endless conveyors 14 would operate in unison with the tractor crank shaft and would convey the snow to the hopper 17 in volumes commensurate with that of the depth of the snow, the width or bite of the scoop 12 and the speed of the tractor.

The worm 30, included upon the shaft 25, and projected within the bottom of the hopper 17 would direct the snow to the housing 28 from whence it would be blown or otherwise directed by the fan or blower 29 through the discharge pipe 31. The pipe or nozzle 32 is adapted to discharge the snow upon either side of the path made by the scoop and endless conveyors. The location of the nozzle being controlled by the shaft 41 and inasmuch as the nozzle may be made of any desired length, the snow could be deposited at some distance from the scoop or path made thereby.

Although I have shown, described and illustrated the invention as being primarily designed in the scooping and removing of snow from highways, it is obviously understood that the same could be advantageously employed for other uses, such as the removal and discharging of loose dirt, silo filling and etc.

The invention is susceptible of various changes in its form, proportions and minor details of construction, and the right is herein reserved to make such changes as properly fall within the scope of the appended claim.

Having thus described the invention, what is claimed is:—

A snow remover comprising a scoop disposed at a downward inclination toward a road surface, conveyors included within the scoop, a hopper located adjacent the discharge ends of the conveyors, a baffle plate forwardly and outwardly converging from the rear wall of the hopper to deflect the work as discharged from the conveyors within the hopper, a blower and housing therefor having communication with the hopper through an opening in the rear wall thereof, and a worm operable within the bottom of the hopper and in conjunction with the blower through the communicating opening.

In testimony whereof I affix my signature.

ALBERT NELSON.